United States Patent
Cornett et al.

(10) Patent No.: US 10,710,039 B2
(45) Date of Patent: Jul. 14, 2020

(54) DEVICE AND METHOD FOR LOADING PELLETS

(71) Applicant: Tubemaster, Inc., Louisville, KY (US)

(72) Inventors: Douglas K Cornett, LaGrange, KY (US); Clifford L Johns, Louisville, KY (US)

(73) Assignee: Tubemaster, Inc., Louisville, KY (US)

( * ) Notice: Subject to any disclaimer, the term of this patent is extended or adjusted under 35 U.S.C. 154(b) by 219 days.

(21) Appl. No.: 15/814,443

(22) Filed: Nov. 16, 2017

(65) Prior Publication Data
US 2018/0141016 A1    May 24, 2018

Related U.S. Application Data

(60) Provisional application No. 62/424,614, filed on Nov. 21, 2016.

(51) Int. Cl.
*B01J 8/00* (2006.01)

(52) U.S. Cl.
CPC ............. *B01J 8/003* (2013.01); *B01J 8/0025* (2013.01); *B01J 2208/00752* (2013.01)

(58) Field of Classification Search
CPC ... B01J 8/003; B01J 8/06; B01J 8/0015; B01J 8/002; B01J 8/0025; B01J 8/0035; B01J 8/12; B01J 8/08; B01J 2208/00752; B01J 2208/00778; B01J 2208/06; B01J 2208/00769; B01J 2208/00761; F23K 3/00; B65G 65/40; B65G 11/026; B65G 11/206

See application file for complete search history.

(56) References Cited

U.S. PATENT DOCUMENTS

| | | | | |
|---|---|---|---|---|
| 2,292,716 A | * | 8/1942 | Pyzel | B01J 8/0015 210/263 |
| 2,666,528 A | * | 1/1954 | Frandsen | B01J 8/003 210/268 |
| 3,778,962 A | * | 12/1973 | James | B01J 8/002 53/473 |
| 3,844,726 A | * | 10/1974 | Denaeyer | B01J 8/002 23/301 |
| 2011/0203970 A1 | * | 8/2011 | Albin | B01J 8/0015 208/113 |

* cited by examiner

*Primary Examiner* — Glenn F Myers
(74) *Attorney, Agent, or Firm* — Theresa Camoriano; Guillermo Camoriano; Duncan Galloway Egan Greenwald PLLC

(57) ABSTRACT

A device and method for loading pellets. A funnel includes a means for loading pellets into a reactor tube, and a means for quickly and easily measuring the elevation of pellets in the reactor tube while the reactor tube is being loaded. A vacuum-assist device may be used to pick up and transfer a desired volume of porous pellets while removing dust from the porous pellets.

5 Claims, 15 Drawing Sheets

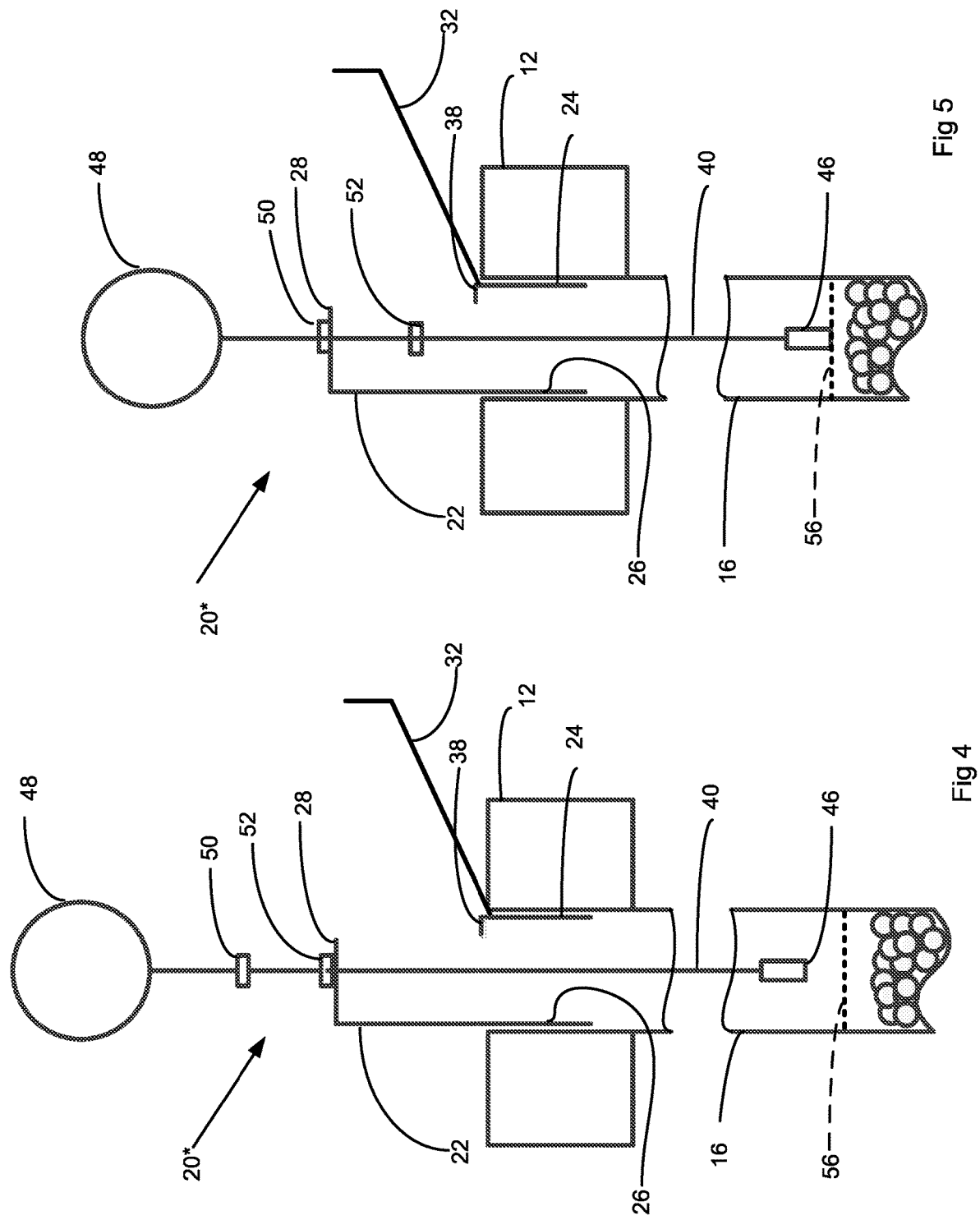

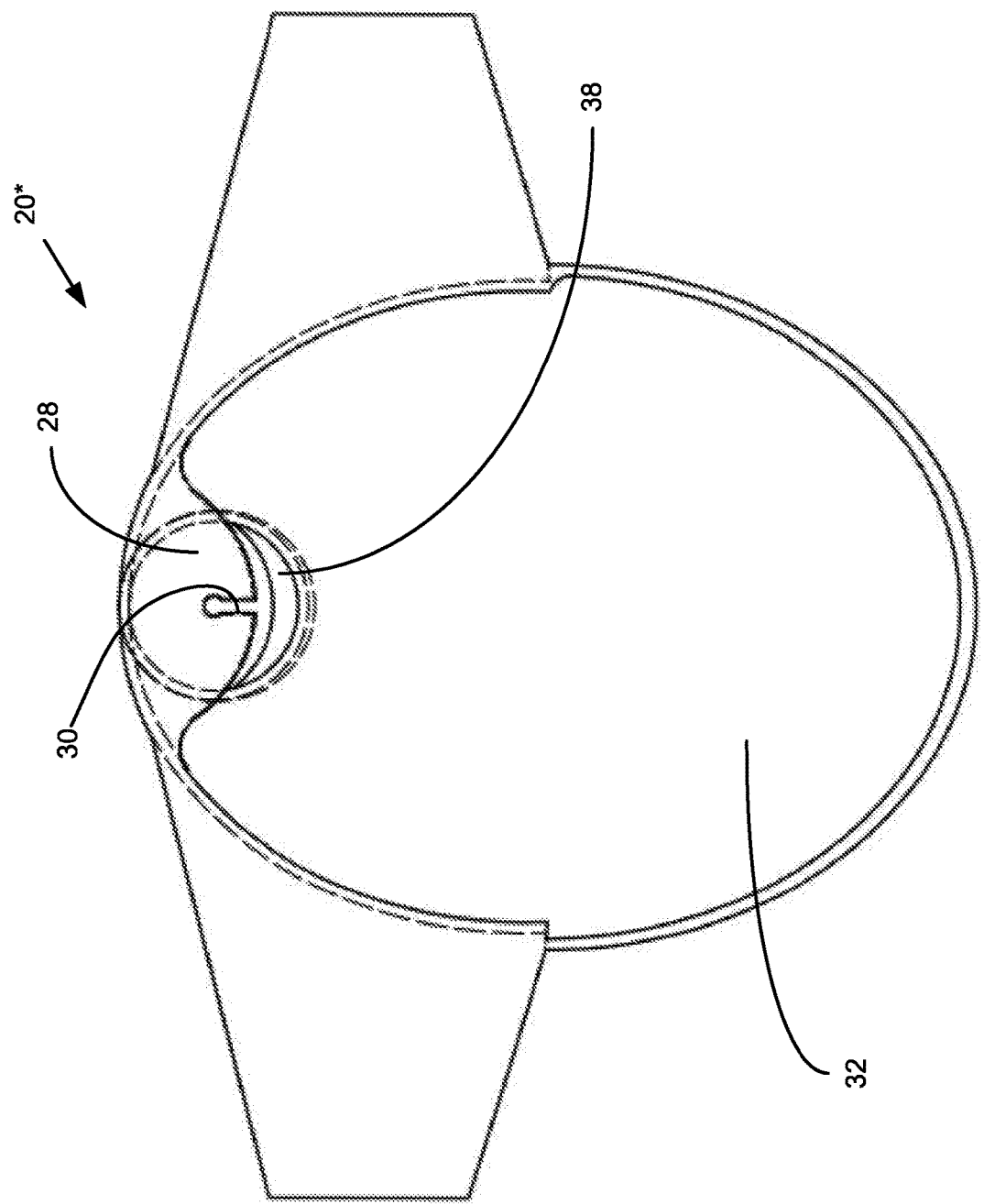

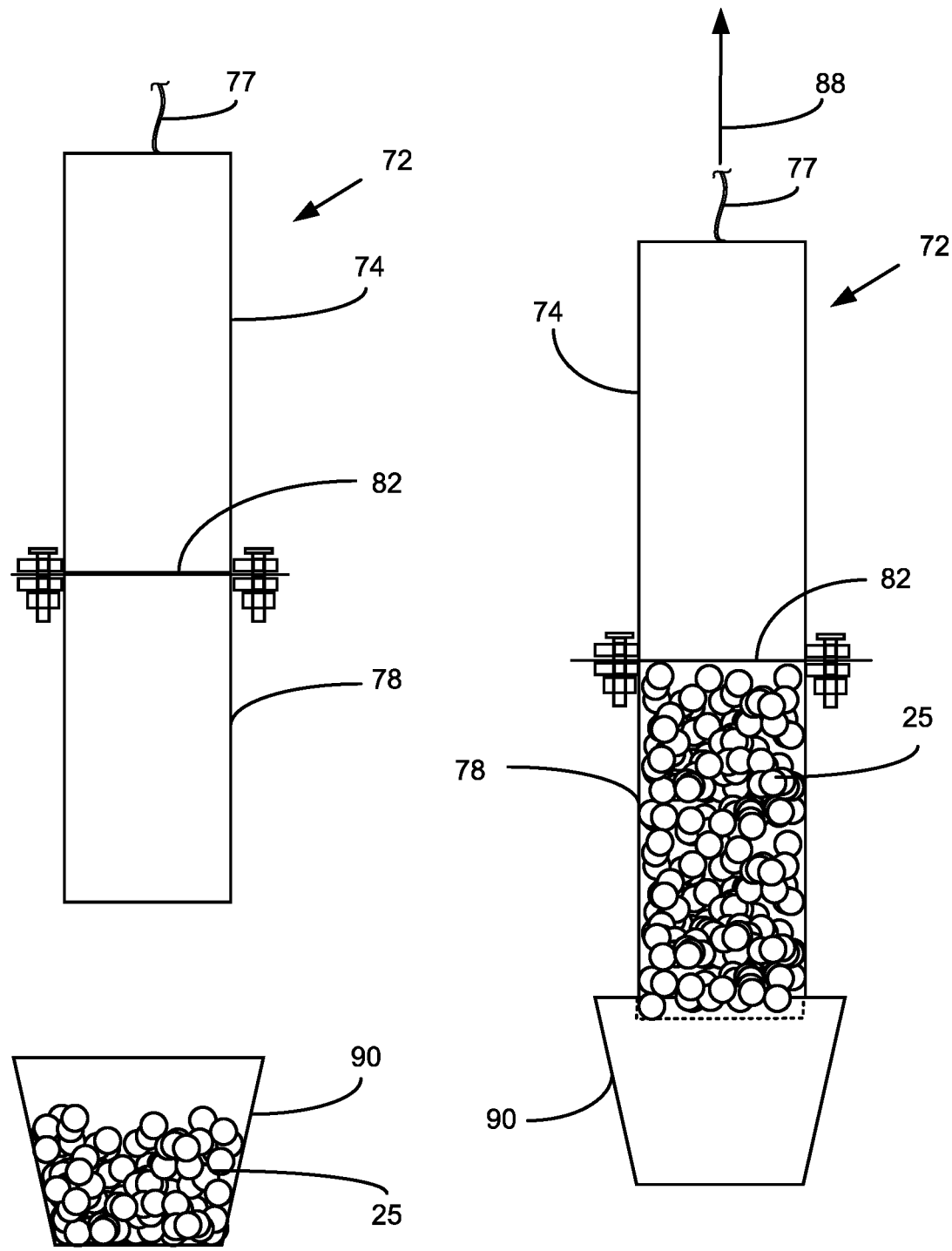

DEVICE AND METHOD FOR LOADING PELLETS

This application claims priority from U.S. Provisional Application Ser. No. 62/424,614 filed Nov. 21, 2016, which is hereby incorporated herein by reference.

BACKGROUND

The present invention relates to a device for loading catalyst or other pellets, and especially for loading pellets into the vertical reactor tubes of a chemical reactor.

Many chemical reactors are essentially a large shell and tube heat exchanger vessel, with the reaction occurring inside the tubes and a coolant circulating in the vessel outside the tubes. A chemical reactor vessel also can be a simple tank with a single volume of catalyst inside it, or it may be a single large tube. Some chemical reactions occur in furnace or reformer tubes, which may be a part of a system with 10 to 5000 or more such tubes. In any of these reactor vessels, catalyst, typically in the form of pellets (and other types of pellets that are not catalyst such as inert material or inert pellets), may be loaded into the reactor to facilitate the reaction. The pellets are replaced periodically.

The reactor tubes may be quite long, housed in a structure several stories tall, and the pellets may be transported up several stories to an elevation above the top of the tubes so they may then flow by gravity into the tubes. The pellets typically are supplied in 2,000 pound (or larger) "super sacks", 55 gallon drums, mini drums, metal bins or plastic bags loaded in pallet-mounted cardboard boxes.

The pellets are then carefully loaded into each reactor tube (there may be several thousand tubes in a single reactor) to try to uniformly fill each tube. In some applications, each tube may be 40 feet long or longer and the customer may wish to load the tubes with a particular loading profile. For instance, the customer may wish to have a 12 to 18 inch layer of inert pellets at the bottom of each tube followed by a layer several feet thick of catalyst A, then a second layer of inert pellets of a given height, and finally a layer several feet thick of catalyst B.

In the prior art, the operator loading the pellets into the reactor tubes loads a few pellets into the tube and then inserts a long tape or rod down the tube to determine the level of the pellets in the tube. If the pellet level is too low, he pulls the tape or rod out of the tube, loads a few more pellets into the tube and repeats the operation until he finally ensures that the pellets have reached the correct height in the tube. Since this is a very cumbersome and time-consuming process, the operator often takes shortcuts, such as adding too many pellets before taking a new reading of the height in the tube. If he overshoots the level (and when taking the shortcut he will eventually overshoot the desired height in a tube), he has to try to remove some of the excess pellets, which can be an ordeal when trying to vacuum pellets that are 40 feet down inside the tube.

Furthermore, it takes time to drop the tape or rod down the tube and then pick it back up every time he needs to check the level of the pellets in the tube. The operator then tends to drop the rod down into the tube to save time, but in the process he smashes the catalyst pellets already in the tube, damaging the catalyst pellets and generating unwanted dust, both of which negatively impact the pressure drop across the tube and the performance of the catalyst.

SUMMARY

The present invention provides ease in loading and allows the operator to quickly and easily ascertain the pellet level in the tube. In one embodiment, a cord with a weight at its distal, free end is reeled into the tube through a special loading funnel. The cord and weight remain hanging from the funnel as the pellets are loaded into the tube, with the weight slightly above the desired pellet level in the tube. The tube is then purposely under-filled, and the cord is lowered until the weight touches the pellets. A quick measure is taken by the operator to see how much more he needs to add to the tube to reach the desired pellet height, for instance, two more inches. He then pulls the weight back up above the desired pellet height (but not necessarily out of the tube) and adds pellets to reach the desired height or elevation in the tube. Since the cord and the weight are already in the tube and at a height which is just slightly above the desired height of the catalyst pellets (also referred to as the desired outage level), the measurement process is very quick and easy. The operator has no incentive to take a shortcut, and he can repeat the process until he obtains the exact pellet height.

In one embodiment, the funnel provides a handy stop for the cord. In another embodiment, the funnel includes a separate but connected chamber to temporarily measure out the pellets prior to feeding them down the funnel and into the tube. This gives the operator greater control of the number of pellets he adds to the tube to prevent a sudden gush of pellets from pouring into the tube.

The catalyst pellets often are friable, such that they easily crumble when handled roughly or handled too often, resulting in damaged catalyst pellets and generating unwanted dust, both of which, as indicated earlier, negatively impact the pressure drop across the tube and the performance of the catalyst. In another embodiment, a vacuum-assisted device is used to pick up a measured quantity (or load) of pellets to deliver to the aforementioned funnel for loading into the tube. The vacuum assisted device not only gently picks up the pellets; the design of the vacuum-assisted device provides for automatic removal of very small pieces of pellets and dust particles from the load of pellets in the process of transferring the pellets to the funnel or onto a loading surface such as a tube sheet or on top of catalyst loading sleeves or a template and provides for controlled release of the pellets.

BRIEF DESCRIPTION OF THE DRAWINGS

FIG. 4 is a schematic section view, similar to FIG. 3 with the cord and weight in the elevated position just above the desired height in the reactor tube and with the pellets below the desired height;

FIG. 5 is a schematic section view, similar to FIG. 4 but with the cord and weight in the lowered position to check on the height;

FIG. 10 is a plan view of the funnel of FIG. 9;

FIG. 11 is a section view of a vacuum-assisted container for transferring a load of pellets to the funnel of FIGS. 2-10;

FIG. 12 is a section view of the vacuum-assisted container of FIG. 11, after having picked up a load of pellets;

DESCRIPTION

Figure 1:
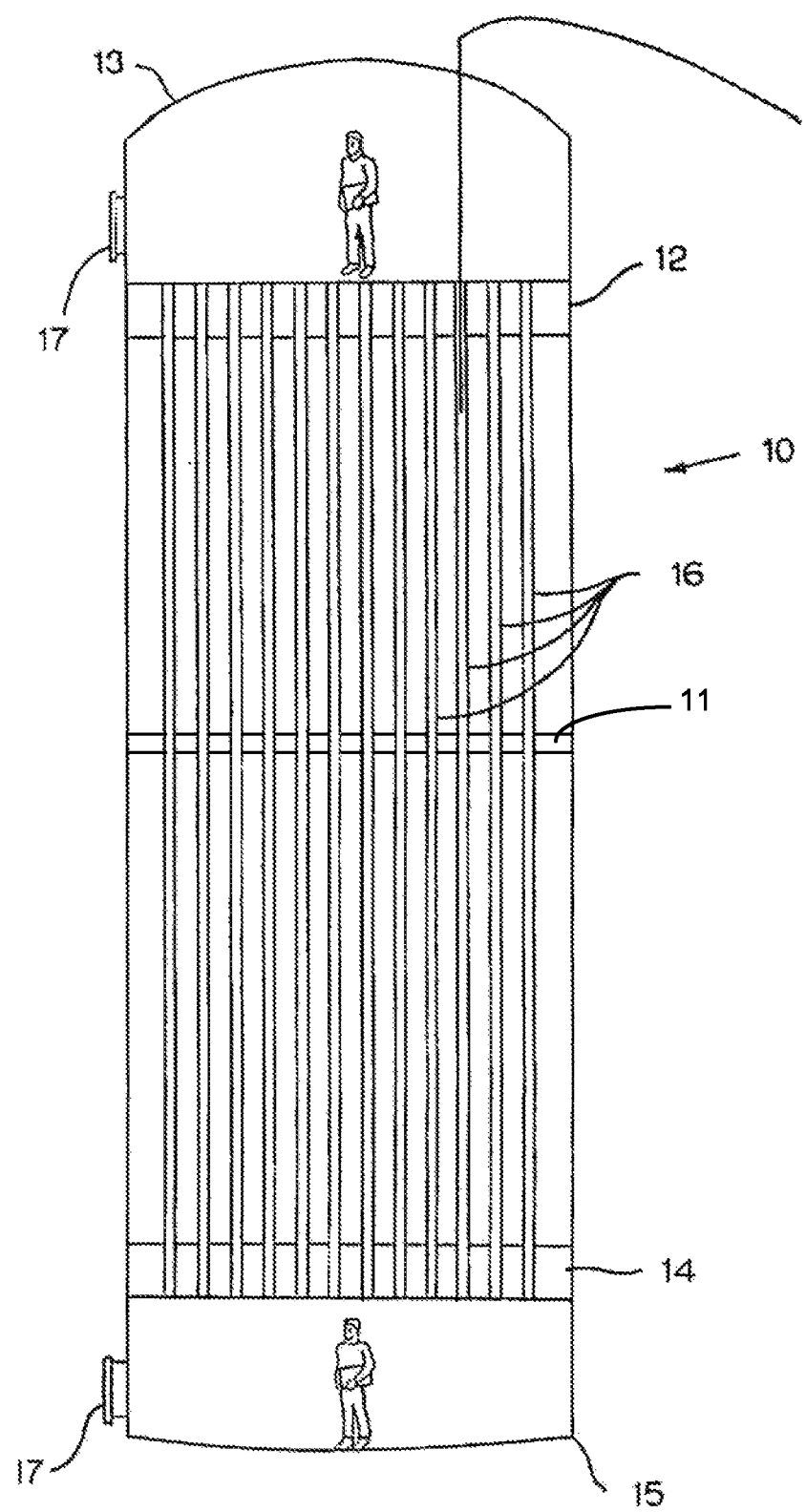
FIG. 1 is a schematic, section view of a shell and tube type of chemical reactor vessel.

FIG. 1 depicts a typical chemical reactor vessel 10, which is a shell and tube heat exchanger, having an upper tube sheet 12 and a lower tube sheet 14 with a plurality of vertical tubes 16 welded or expanded to the tube sheets 12, 14 to form a tightly packed tube bundle. There may be from one to many hundreds or even thousands of cylindrical tubes 16 extending between the upper and lower tube sheets 12, 14. Each tube 16 has a top end adjacent the upper tube sheet 12 and a bottom end adjacent the lower tube sheet 14, and the tubes 16 are open at both ends, except that there may be a clip at the bottom end to retain catalyst pellets or other pellets inside the tube. The upper and lower tube sheets 12, 14 have openings that are the size of the outside diameter of the tubes 16, and these openings receive the respective tubes 16 with a tight fit.

The vessel 10 includes a top dome (or top head) 13 and a bottom dome (or bottom head) 15, as well as manways 17 for access to the inside of the vessel 10. The manways are closed during operation of the reactor but are opened for access, such as during catalyst handling. In this instance, the tubes 16 are filled with catalyst pellets, which facilitate the chemical reaction. (It may be noted that similarly-shaped shell and tube heat exchangers may be used for other purposes, such as for a boiler or other heat exchanger.)

This particular reactor vessel 10 is fairly typical. Its tubes may range in length from 5 feet to 65 feet, and it is surrounded by a structural steel skid or framework (not shown), which includes stairways or elevators for access to the tube sheet levels of the reactor vessel 10 as well as access to intermediate levels and to a topmost level which may be located at or near the level of the top opening of the reactor vessel 10. On a regular basis, which can be every 2 to 48 months or longer, as the catalyst becomes less efficient, less productive, or "poisoned", it is changed out, with the old catalyst being removed and a new charge of catalyst being installed in the tubes 16 of the reactor vessel 10. Catalyst handling also may have to be done on an emergency basis, on an unplanned and usually undesirable schedule.

Some chemical reactors 10 may require "layered" loading of catalyst and/or inert pellets into the tubes 16. For example, a reactor vessel 10 may have one or more intermediate tube sheets 11. In that case it is not unusual to require the loading of inert pellets at the height of the intermediate tube sheets 11 to prevent overheating of the tubes 16 in the area of the intermediate tube sheets 11. In this instance, a reactor 10 may have a bottom layer 12 to 18 inches high of inert pellets, then a first layer of catalyst "A" several feet high, then a second layer of inert pellets at the height of the intermediate tube sheet 11 and then a layer of catalyst "B" several feet high.

It is important that each layer extend between the correct upper and lower heights (elevations in the tube). Typically, the specification on the loading profile will call for a specific height level, plus or minus the desired tolerance. For example, the second layer of inert pellets may be required to extend from an elevation 15 feet+/−1 inch below the top of the upper tube sheet 12 to an elevation 14 feet+/−1 inch below the top of the upper tube sheet 12, to provide a layer of inert pellets that is one foot in height. We will refer back to these example heights later in this specification.

Figure 2:
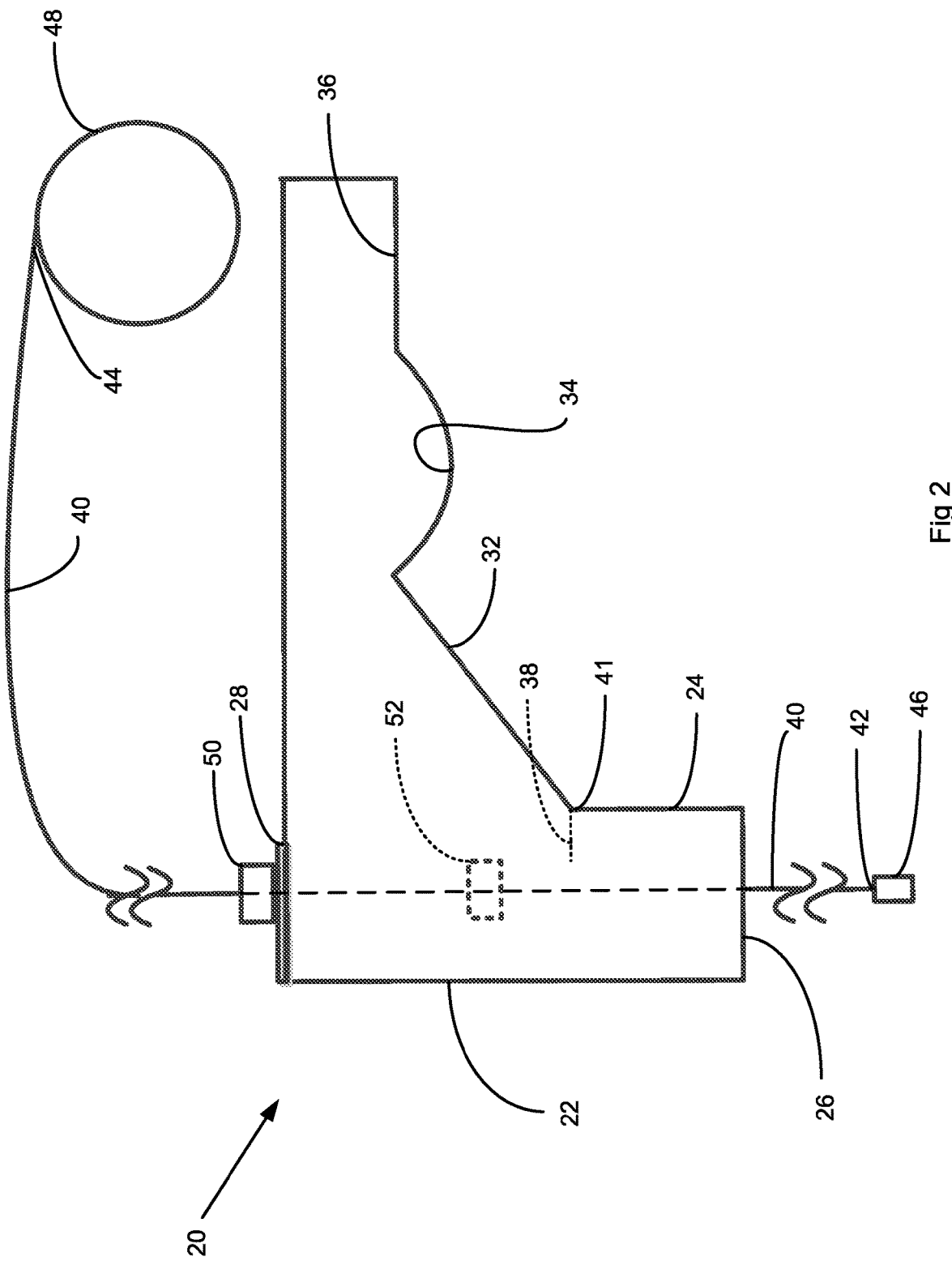
FIG. 2 is a schematic side view of a funnel used for loading pellets into a reactor tube to a desired height.
Figure 2A:
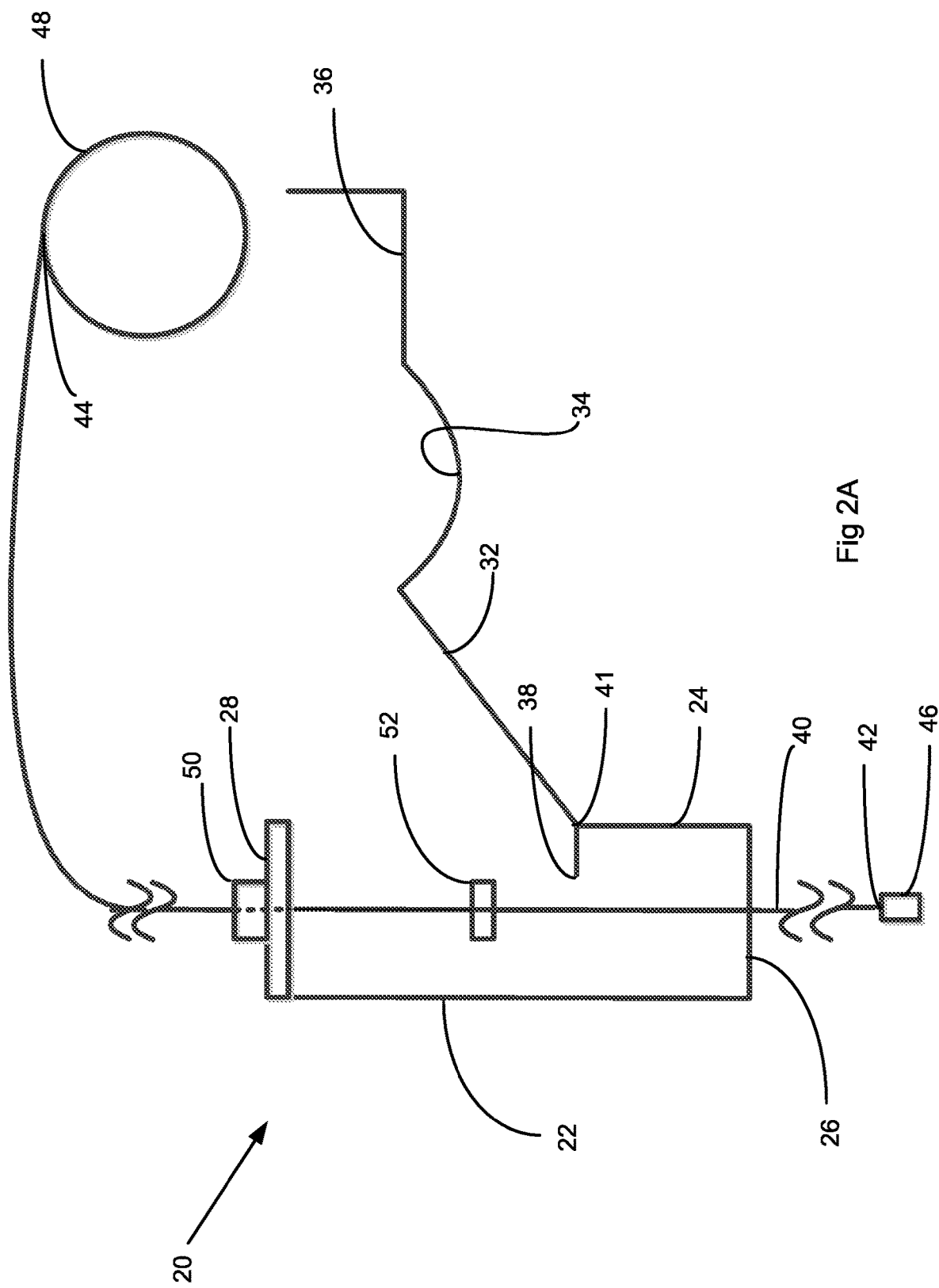
FIG. 2A is a schematic section view through the funnel of FIG. 2.

Referring to FIGS. 2 and 2A, the funnel 20 is used to load pellets into reactor tubes 16 (not shown in these views) to the desired height. The funnel 20 has a vertically oriented main body 22 with a lower conduit 24 defining a funnel outlet 26. In this embodiment, the conduit 24 has a cylindrical shape and is sized with an outside diameter just slightly smaller than the inside diameter of the reactor tube 16.

Figure 6:
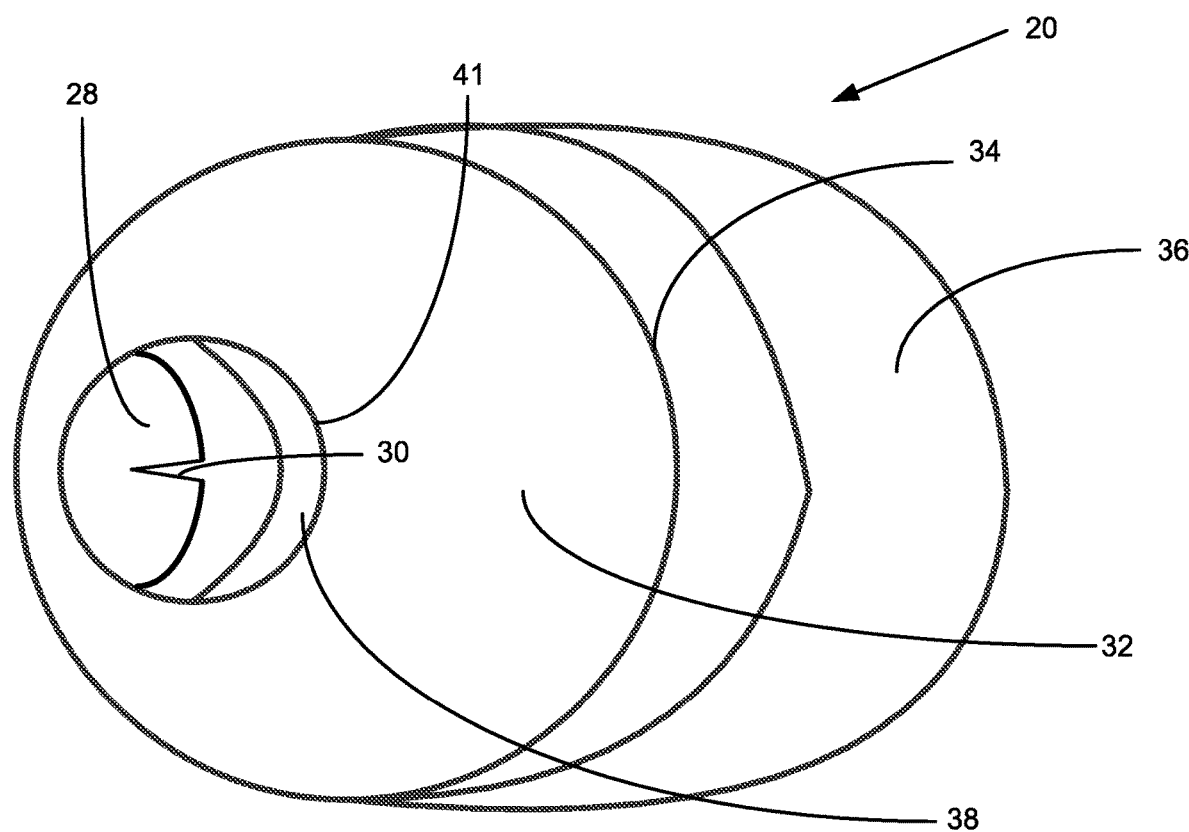
FIG. 6 is a schematic plan view of the funnel of FIG. 2.
Figure 9:
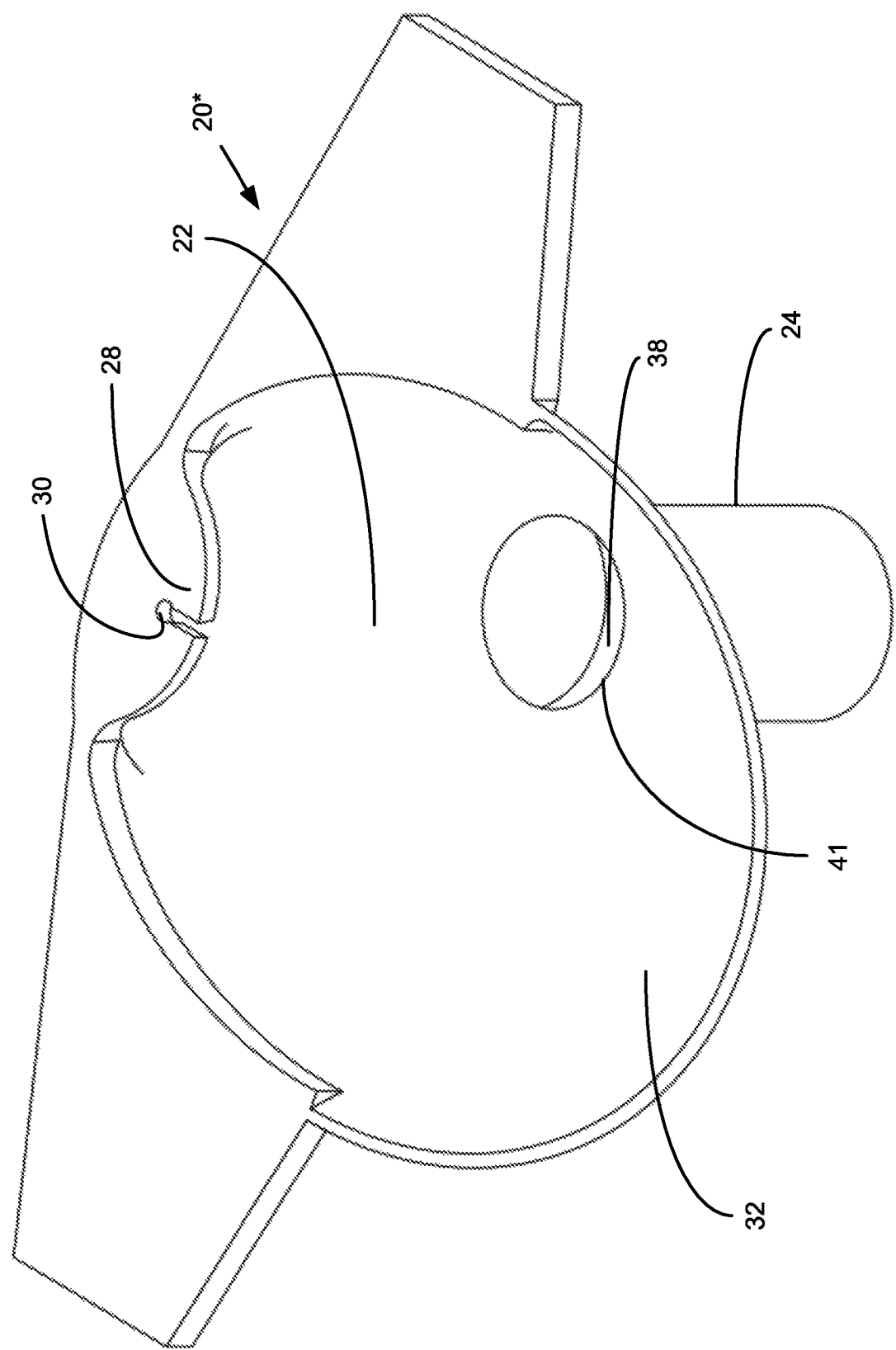
FIG. 9 is a perspective view of the funnel of FIGS. 3-5.

At the top of the funnel 10, directly above the outlet 26, is a plate 28, which defines a slotted opening 30 (See FIGS. 6, 9 and 10). The plate 28 is supported by a wall 22, which extends upwardly from a first side of the lower conduit 24. A sloped surface 32 extends upwardly from a second side of the lower conduit 24, extending to an upwardly concave, arcuate surface portion 34 and then to a pellet staging tray 36, which has a bottom that is at a lower elevation than the top of the arcuate surface portion 34. A short ledge or projection 38 extends inwardly into the main body 22 of the funnel 10 at the top edge of the lower conduit 24, along the line 41 where the sloped surface 32 and the lower conduit 24 intersect. This ledge 38 creates a reduced diameter top opening (which may be referred to as an orifice or inlet), which has a smaller diameter than the rest of the lower conduit 24, which limits the number of pellets that can travel through the conduit 24 and through the outlet 26 of the funnel 20 at any given moment so as to prevent bridging of the pellets inside the conduit 24 and inside the reactor tube 16 into which the conduit 24 is inserted.

A complementary part of the apparatus includes a cord or cable 40 having a distal end 42 and a proximal end 44. The proximal end 44 is secured to a reel 48 which supports the cord 40 and assists the operator in winding the cord 40 up and in unwinding the cord 40. The distal end 42 hangs freely and has a weight 46 attached to it. The weight 46 preferably is a small and dense weight, preferably cylindrically-shaped, with the elongated axis of the cylinder oriented in the vertical direction so as to minimize any interference between the weight 46 and the pellets being loaded into the reactor tube 16.

The cord 40 includes a first stop 50 and a second stop 52. These stops 50, 52 can be as simple as a knot or other enlargement on the cord 40. Preferably, the stops 50, 52 can be easily relocated along the length of the cord 40, but once they are secured to the cord 40, they will each remain in their respective positions unless relocated by the operator.

Figure 7:
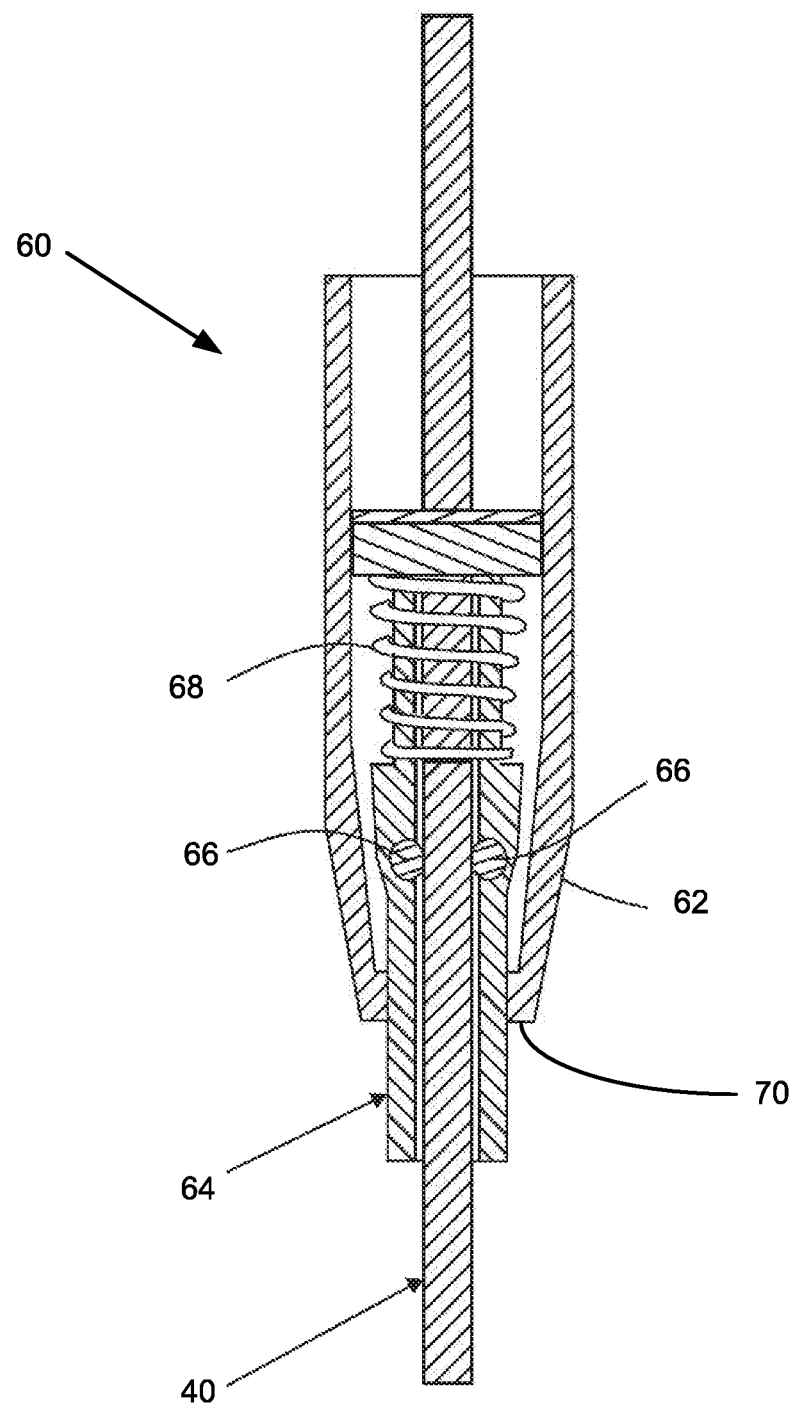
FIG. 7 is a section view of an embodiment of a stop which may be used for the stops 50, 52 of FIG. 2.

FIG. 7 shows the details of one type of stop 60 which may be used for the first and second stops 50, 52 of FIGS. 2-5. The housing 62 of the stop 60 is normally fixed relative to the cord 40. The housing 62 has a generally cylindrical, tubular shape, except that the inside surface tapers to a smaller diameter at the bottom end 70. A plunger 64 also having a generally cylindrical, tubular shape, is coaxial with the housing 62, and moves in and out longitudinally along its axis relative to the housing 62, with the bottom end of the plunger 64 projecting out beyond the bottom end 70 of the housing 62. Three ball bearings 66 are housed in the plunger 64, and, as the plunger 64 moves downwardly and the inside diameter of the housing 62 decreases, the ball bearings 66 are pushed inwardly, causing the ball bearings 66 to grip the cable 40 that extends through the plunger 64 and the housing 62 so the cable 40 stops moving relative to the housing 62.

A biasing spring 68 biases the plunger 64 downwardly, so the stop 60 is normally locked and fixed in position on the cord 40. However, if the user wants to relocate the stop 60 on the cord 40, he can push in on the plunger 64, moving it upwardly, against the biasing force of the spring 68, which releases the stop 60, allowing the cable 40 to move freely in either direction. He then releases the plunger 64 when the stop 60 is in the desired position, and the stop is then locked in place at the desired position.

The stop 60 is normally mounted onto the cord 40 in the orientation shown in FIG. 7 such that the bottom shoulder 70 of the housing 62 abuts the top of the plate 28 of the funnel 20, locking the stop 60 onto the cord 40. Note that, for this particular embodiment of a stop 60 to operate properly, the cord 40 and the bottom edge of the plunger 64 should be able to project unimpeded through the slotted opening 30 (See FIG. 6) in the top plate 28. Of course, other types of stops, such as knots, may be used if preferred.

The location of the first stop 50 is chosen such that when the first stop 50 is resting on the top plate 28, the bottom of the weight 46 is at the desired top elevation (may also be referred to as the outage height) of the pellets. For instance, in our earlier example, when loading the first layer of catalyst "A", the position of the first stop on the cord is chosen such that, when the first stop 50 is resting on the top plate 28, and the funnel is fully inserted into the reactor tube 16, the bottom of the weight is at the 15 foot height or elevation.

The location of the second stop 52 is not critical. Preferably it should be far enough below the first stop 50 to allow the operator enough room to raise the weight 46 to be out of the way and then to lower the weight 46 to "feel" for the catalyst height level in the tube 16, as explained in more detail below. The second stop 52 is located such that when the second stop 52 is abutting the bottom of the plate 28, the weight 46 is some desired distance above the desired height 56, as shown in FIG. 3.

Figure 3:
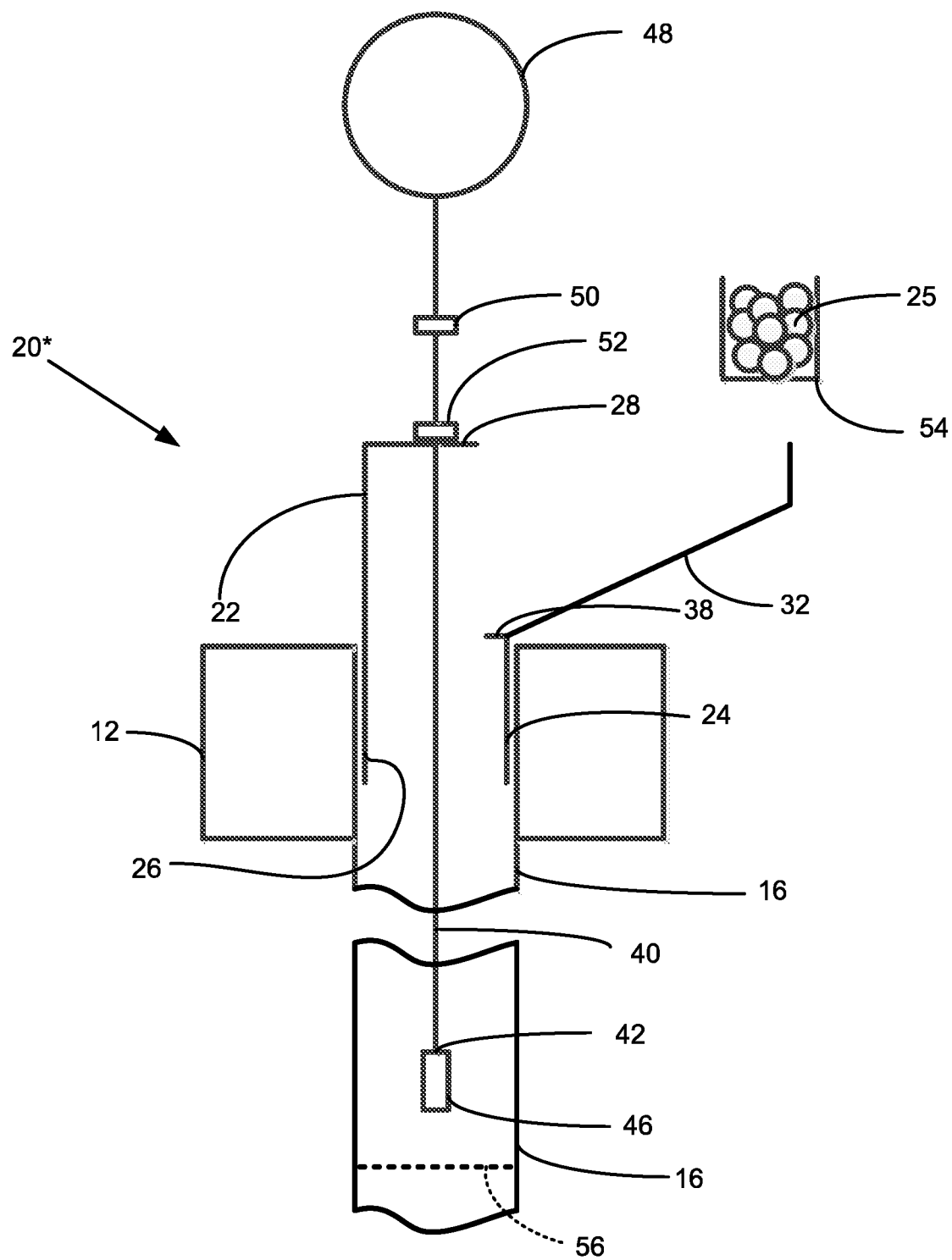
FIG. 3 is a schematic section view, similar to FIG. 2A but for another embodiment of a funnel, showing the funnel inserted into a reactor tube.

To use the funnel 20, 20\*, the operator first places the lower conduit 24 of the funnel 20 inside a reactor tube 16 that is to be loaded with pellets, with the upper portion of the funnel 20, 20\* above the lower conduit 24 resting on the upper tube sheet 12, as shown in FIG. 3. Then he sets up the stops 50, 52 at the desired positions on the cord 40 such that when the first stop 50 is resting on the plate 28, with the cord extending through the slotted opening 30, the bottom of the weight 46 is at the desired top elevation 56 for the layer of pellets to be loaded. The cord 40 is inside the funnel 20, 20\* such that the slotted opening 30 on the plate 28 straddles the cord 40 and the second stop 52 is resting atop the plate 28 (as shown in FIG. 3). The operator then slowly adds pellets 25 directly to the sloped surface 32\* of the funnel 20\* as shown in FIG. 4 or, if using the funnel 20 of FIG. 2, he would add the pellets 25 to the staging tray 36 and then carefully transfer the pellets 25 from the staging tray 36, over the concave surface 34 and onto the sloped surface 32. The pellets 25 tumble down the sloped surface 32, past the reduced diameter opening 38, and through the lower conduit 24 and the outlet 26 into the reactor tube 16, until the pellets 25 reach an elevation in the reactor tube 16 as shown in FIG. 4.

The tray 36 allows the operator to carefully control the number of pellets 25 fed through the funnel 20. Many catalyst pellets 25 are odd-shaped and abrasive, resulting in unpredictable pouring out of a container 54 (See FIG. 3). At first, very few if any pellets 25 pour out of the container 54. As the container 54 is tilted farther to encourage the pellets 25 to pour out, there comes a point where all or most of the pellets 25 gush out all at once making it difficult to control how many pellets 25 are introduced into the tube 16. By using the staging tray 36, the operator can pour small quantities of pellets 25 into the tray 36 and then transfer those pellets 25 practically individually, if desired, by swiping his hand (or other tool, such as a brush or paddle) across the tray 36 to drag some pellets 25 over the concave surface 34 and onto the sloped surface 32. The sloped surface 32 also allows the operator to see the pellets 25 as they are being poured into the reactor tube 16.

The operator fills the reactor tube 16 to a level where he is sure he is still below the desired height or elevation 56, as shown in FIG. 4.

It should be noted that the operator may use the funnel 20 or other devices, such as conventional loading sleeves, to pre-load each reactor tube 16, preferably pre-loading each reactor tube 16 to a level below the desired height or elevation 56. In some instances, it may be desirable to fill each reactor tube 16 to an elevation that is above the desired elevation 56, loading all the reactor tubes 16 very quickly using an automated loading system, for instance. If the reactor tubes 16 are over-filled, the pellets 25 in each reactor tube 16 would then be vacuumed back out until a level below the desired elevation 56 is reached.

The operator then finishes loading each reactor tube 16 to the desired elevation 56 using the funnel 20 or 20\*, as described below.

Figure 5A:
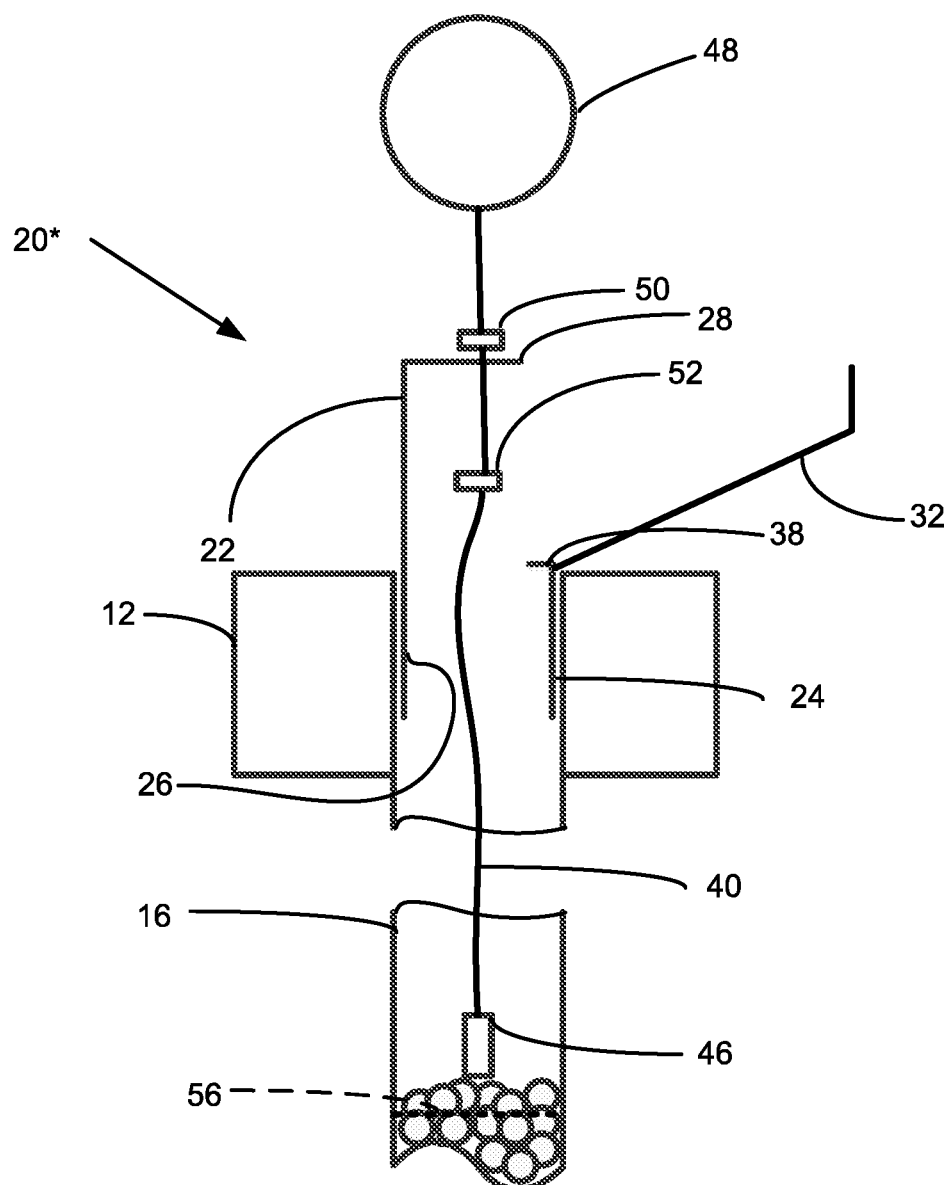
FIG. 5A is a schematic section view, similar to FIG. 5 but with the pellet level just above the desired height, showing the cord with some slack before the upper stop impacts against the funnel stop.

The operator grabs the cord 40 and pulls it out of the slotted opening 30 to allow the second stop 52 to clear the plate 28. Then, as shown in FIG. 5, he reinserts the cord 40 in the slotted opening 30 with the second stop 52 below the plate 28 and the first stop 50 above the plate 28 and proceeds to lower the cord 40. Since the pellets 25 are at an elevation below the desired elevation 56, as shown in FIG. 5, the first stop 50 impacts against the top of the plate 28, indicating that the pellets 25 have not yet reached the desired elevation 56. Then he uses the funnel 20, or 20\*, slowly adding pellets 25 into the reactor tube 16, and raising and lowering the cord 40 until he feels the cord 40 go slack and no longer feels the weight 46 pulling down on the cord 40, as shown in FIG. 5A, indicating that the pellets 25 have reached the desired elevation 56.

This slack condition of the cord 40 indicates to the operator that the actual elevation of the pellets 25 in the reactor tube 16 is at least as high as the desired height 56. The operator then can pull up on the cord 40 until he no longer feels any slack (until he again feels the weight 46 pulling down on the cord 40) and can measure the distance between the bottom of the first stop 50 and the top of the upper plate 28 to get a measurement of how far above the desired elevation 56 is the actual elevation of the pellets 25 in the reactor tube 16. If this visual indication tells him that the actual height is above the desired height 56 by more than the allowable specification, he will have to remove some of the pellets 25. However, if he has been adding the pellets 25 in small quantities and he has been checking regularly, it is likely that he will exceed the desired elevation 56 by a small enough amount that the actual elevation of the pellets is still within the specification.

The operator may set the stops 50, 52 so the weight 46 will be at a desired elevation 56 that is slightly lower than the actual elevation specification when the first stop 50 is resting on the top plate 28, knowing the difference between the specified elevation and the elevation of the bottom of the weight 46 when the first stop 50 is resting on the top plate 28. Then, when he feels a slack in the cord 40, he can raise the cord 40 until he again feels the weight 46 and can measure the gap between the first stop 50 and the top plate 28 to see whether he has reached the specified elevation of the pellets and then add pellets very gradually and keep measuring until the specified elevation is reached. A marking or other indicator may be placed on the cord 40 to help the operator see when the desired gap has been reached.

Once all the reactor tubes 16 in the reactor vessel 10 have been filled to the specified elevation, the stops 50, 52 may be relocated on the cord 40 to measure a new specified elevation for the next layer of pellets. Alternatively, a second cord may be used with the stops 50, 52 already preset for the new specified elevation for the next layer of pellets.

Figure 8:
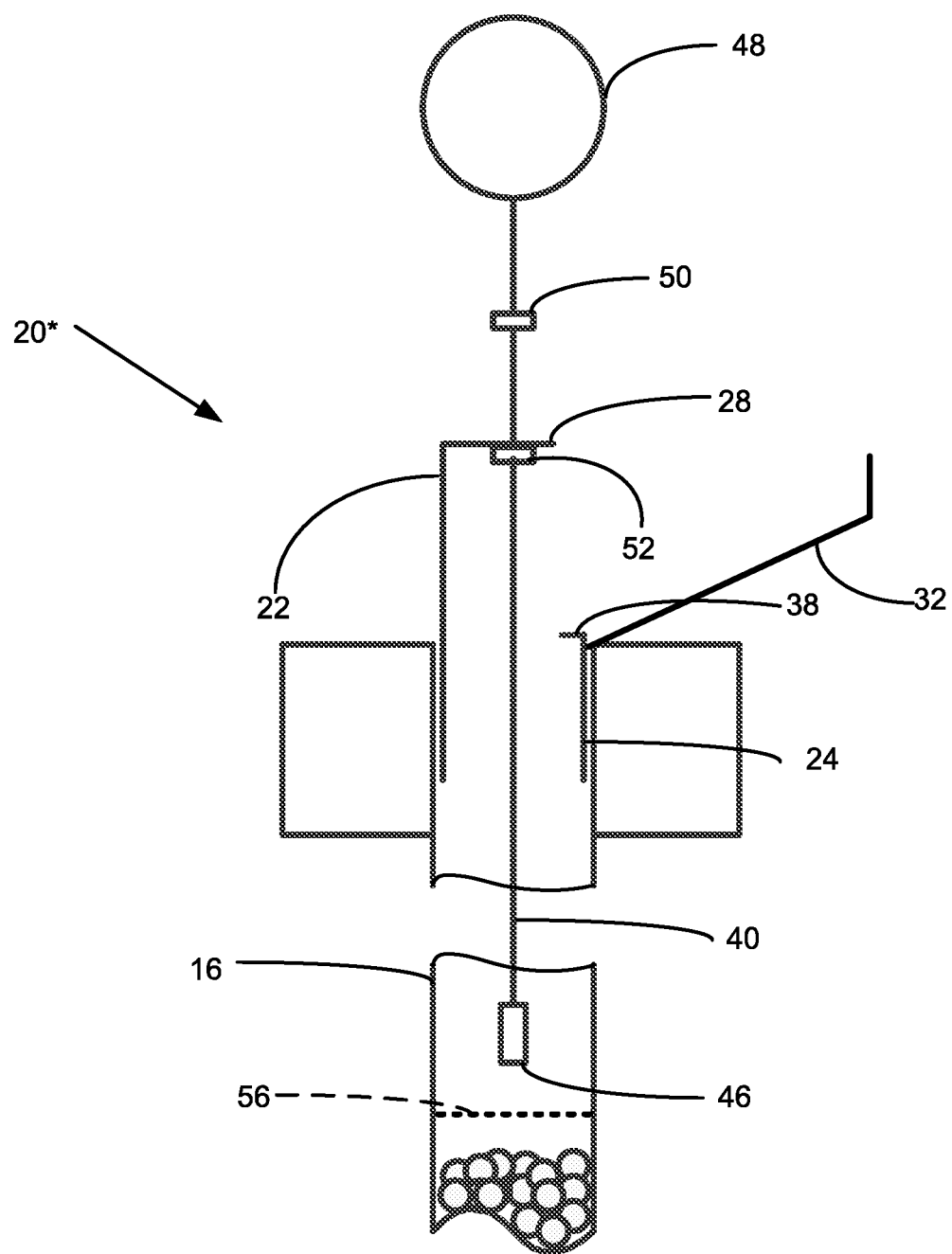
FIG. 8 is a schematic section view, similar to FIG. 4, but for another embodiment of a funnel arrangement.

It should be noted that the reel 48 may incorporate an automatic device (not shown) for reeling in the cord 40. This automatic device may include a weak spring, for instance, with just enough torque to reel in the cord 40 including the combined weights of the cord 40, the stops 50, 52, and the weight 46. When the operator releases the cord 40, the automatic device reels in the cord 40 onto the reel 48 until the second stop 52 impacts against the bottom surface of the plate 28 on the funnel 20, 20*  as shown in FIG. 8 (note that in this instance the orientation of the stop 60 of FIG. 7 would have to be reversed for use as the second stop 52. In this case, the second stop 52 is now acting against a spring force acting upwardly to reel in the cord 40 instead of the stop 50 acting against the force of gravity acting downwardly on the weight 46 to unreel the cord 40).

In this embodiment, including an automatic reeling device, the operation is essentially identical to the other embodiments described above with the exception that the operator no longer has to pull the cord 40 out far enough from the opening 30 on the plate 28 for the second stop to clear the plate 28 and he no longer has to pull up the cord 40 after every height check. He simply grabs the cord 40 at a point above the first stop 50 to counter the weak force pulling up on the cord 40 and pulls down on the cord until the first stop 50 impacts against the plate 28 (indicating that the desired height 56 has not been reached) or until he no longer feels the pull of the weight 46 on the cord 40 (indicating that the actual height of the pellets 25 is at least as high as, or higher than, the desired height 56). As soon as the operator releases the cord 40, it is automatically reeled into the reel 48 until the second stop 52 impacts against the bottom surface of the plate 28.

The plate 28, being at a fixed elevation directly above the top of the reactor tube 16, provides a convenient abutment surface for these stops 50, 52, relative to each of the reactor tubes 16 in the reactor vessel 10. Making the plate 28 a component of the funnel 20, 20* provides for a convenient, practical, and consistent surface that is readily moved along with the loading funnel 20, 20*.

Figure 13:
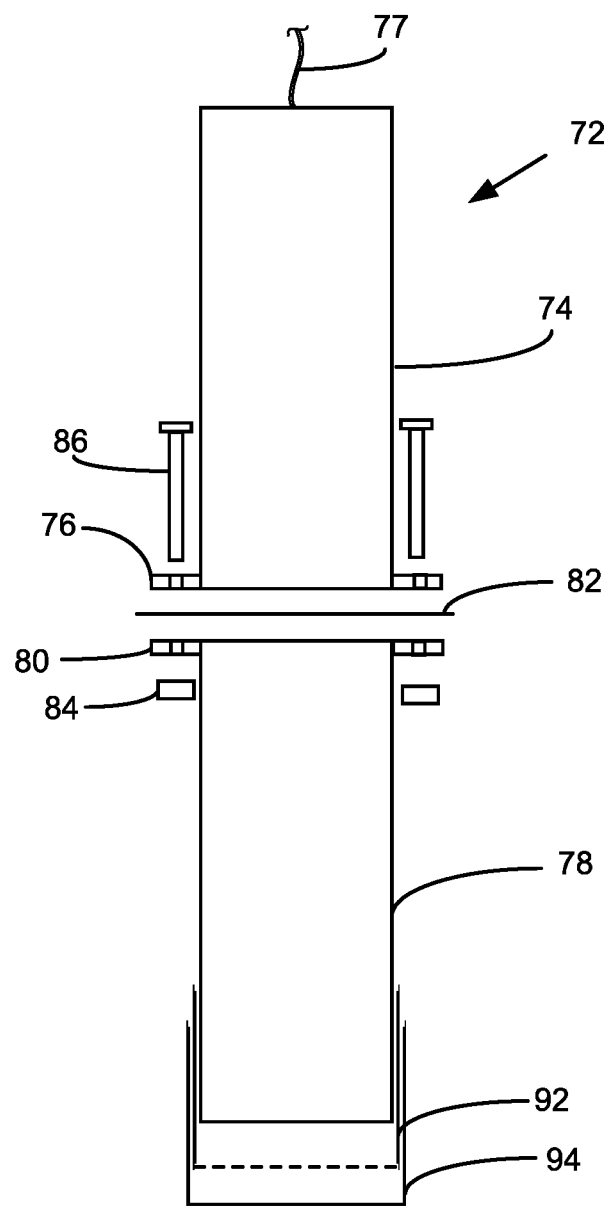
FIG. 13 is an exploded view of the vacuum-assisted container of FIG. 11.

FIGS. 11-13 show a vacuum-assisted device 72 which may be used for transferring pellets 25 to the funnel 20, 20* of FIGS. 2-10 or to a catalyst loading surface such as a tube sheet, catalyst loading sleeve or template or catalyst loading machine (not shown). This device takes advantage of the fact that the catalyst pellets are very porous, so air flows through the porous pellets, allowing a large quantity of the porous pellets to be vacuumed up against a screen without greatly reducing the fluid flow through the screen.

Referring to FIG. 13, the device 72 includes an upper tubular portion 74 having a first bolt flange 76 at its bottom edge, and a lower tubular portion 78 defining a second, mating bolt flange 80 at its top edge. (In this embodiment, the upper and lower tubular portions 74 have the same diameter, but that they could have different diameters. Also, in this embodiment, the upper and lower tubular portions 74 have rigid walls, but the walls could be flexible.)

Figure 14:
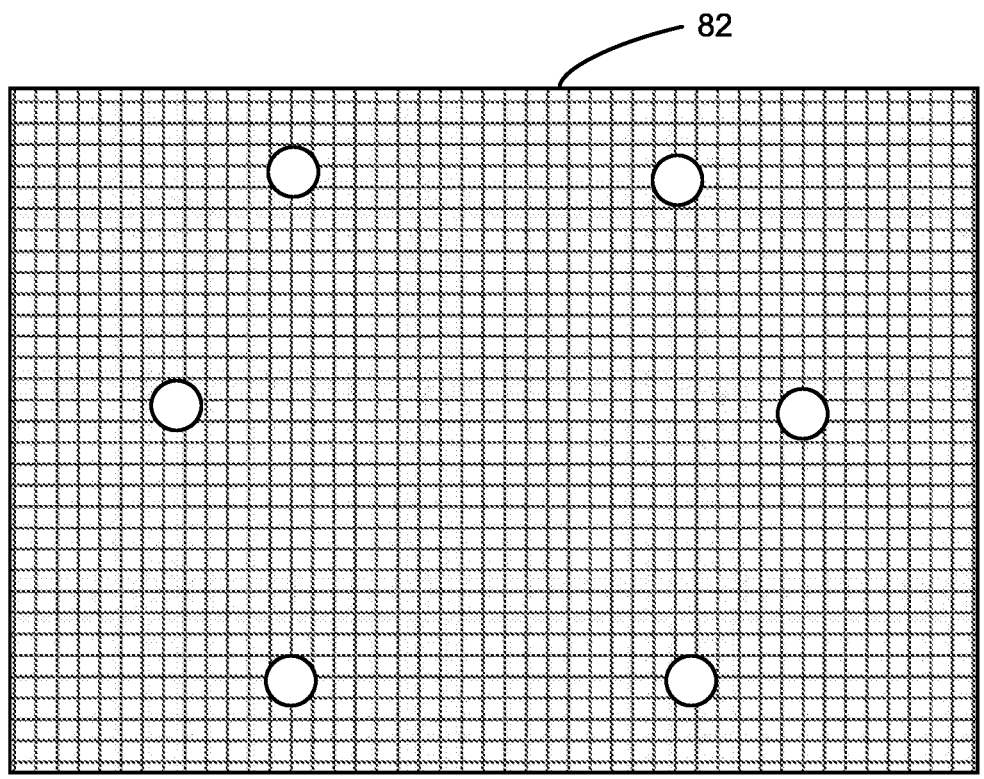
FIG. 14 is a plan view of the screen element of the vacuum-assisted container of FIG. 13.

The first and second bolt flanges 76, 80 have aligned bolt holes and mate with each other. A screen 82 (See also FIG. 14) is sandwiched between the first and second bolt flanges 76, 80. A plurality of nuts 84 and bolts 86 releasably secure the first and second flanges 76, 80 together with the screen 82 sandwiched between them. An optional screen cover 92 covers the bottom opening of the lower tubular portion 78, and an optional solid cover 94 covers the screen cover 92.

A vacuum line 77 is secured to the upper tubular portion 74 and, when the optional covers 92, 94 are removed, the vacuum line 77 creates an upwardly-directed flow of air, represented diagrammatically by the arrow 88 in FIG. 12, with air flowing up through the bottom of the lower tubular portion 78, through the screen 82, and out through the vacuum line 77. This air flow is used to pick up the charge of porous pellets 25 as described below.

In operation, the user first selects a screen 82 having a mesh size that will hold back the smallest size of catalyst pellet being loaded while allowing broken pellet pieces and dust to go through the screen 82. Note that the screen 82 may easily be replaced by a different size mesh as desired depending upon the particular type of porous pellets being handled. Also, one or more screens 82 may be installed with their grids misaligned so as to reduce the size of the opening (reduce the mesh size) as desired.

The user then selects the proper length for the lower tubular portion 78 of the device 72 that will result in the lower tubular portion 78 holding just the right amount (by volume) of porous pellets 25 to be transferred to the funnel 20 or 20* or other loading device when full. The user then assembles the device 72 with the chosen screen mesh size and the chosen length of lower tubular portion 78. He puts the vacuum hose 77 in fluid communication with a vacuum source (not shown) and lowers the open bottom of the lower tubular portion 78 into a container 90 of porous pellets 25. In this view, the container 90 is relatively small and holds the exact amount of porous pellets 25 to be transferred. However, the container 90 may be a very large Super sack, which is typically how catalyst pellets are shipped in bulk from the manufacturer, or it may be any other type of container, as desired.

The porous pellets 25 are drawn into the open bottom of the lower tubular portion 78 of the device 72 by the air flow created by the vacuum source 88, with air flowing through the open bottom, through the porous pellets 25, through the screen, and out to the vacuum source 88 until the lower tubular portion 78 is fully loaded. In the process of drawing the porous pellets 25 into the lower tubular portion 78 of the device 72, any very small pieces of pellets and any dust are drawn through the screen 82 and out through the vacuum system.

If desired, the bottom screen 92 may be releasably secured over the bottom opening of the lower tubular portion 78, the air flow may be turned off, and then the solid cover 94 may be releasably secured over the bottom of the bottom screen 92. The device 72 then may be transported to a desired location before releasing the porous pellets 25. If a solid cover 94 has been placed over the bottom opening, it should be removed before releasing the porous pellets 25. Then, the vacuum source should be turned on, so air can flow through the bottom screen cover 92, through the porous pellets 25, through the screen 82, and out to the vacuum source, pulling any fines out before releasing the porous pellets 25 from the device 72.

The device 72 then may be moved to the funnel 20 or 20* or other loading device or surface, carrying along the porous pellets 25 that are inside the lower tubular portion 78. Once the device 72 is above the funnel 20 or 20* (or other loading device or surface), the bottom screen cover 92 is removed. Then the vacuum from the vacuum source is gradually reduced or completely eliminated to allow the porous pellets 25 to gently fall out of the bottom of the lower tubular portion 78 of the device 72 and into the funnel 20 or 20* (or other loading device).

In this particular embodiment, the upper and lower tubular portions 74, 78 are made of rigid, solid-wall, cylindrical pipes, and the vacuum hose 77 is made of a more flexible material. However, flexible materials could be used for one or both of the tubular portions 74, 78. For example, the lower tubular portion 78 could be a flexible supersack, and the upper tubular portion 74 could be a rigid piece having a smaller diameter, which connects to the vacuum line 77.

Figures 15, 16:
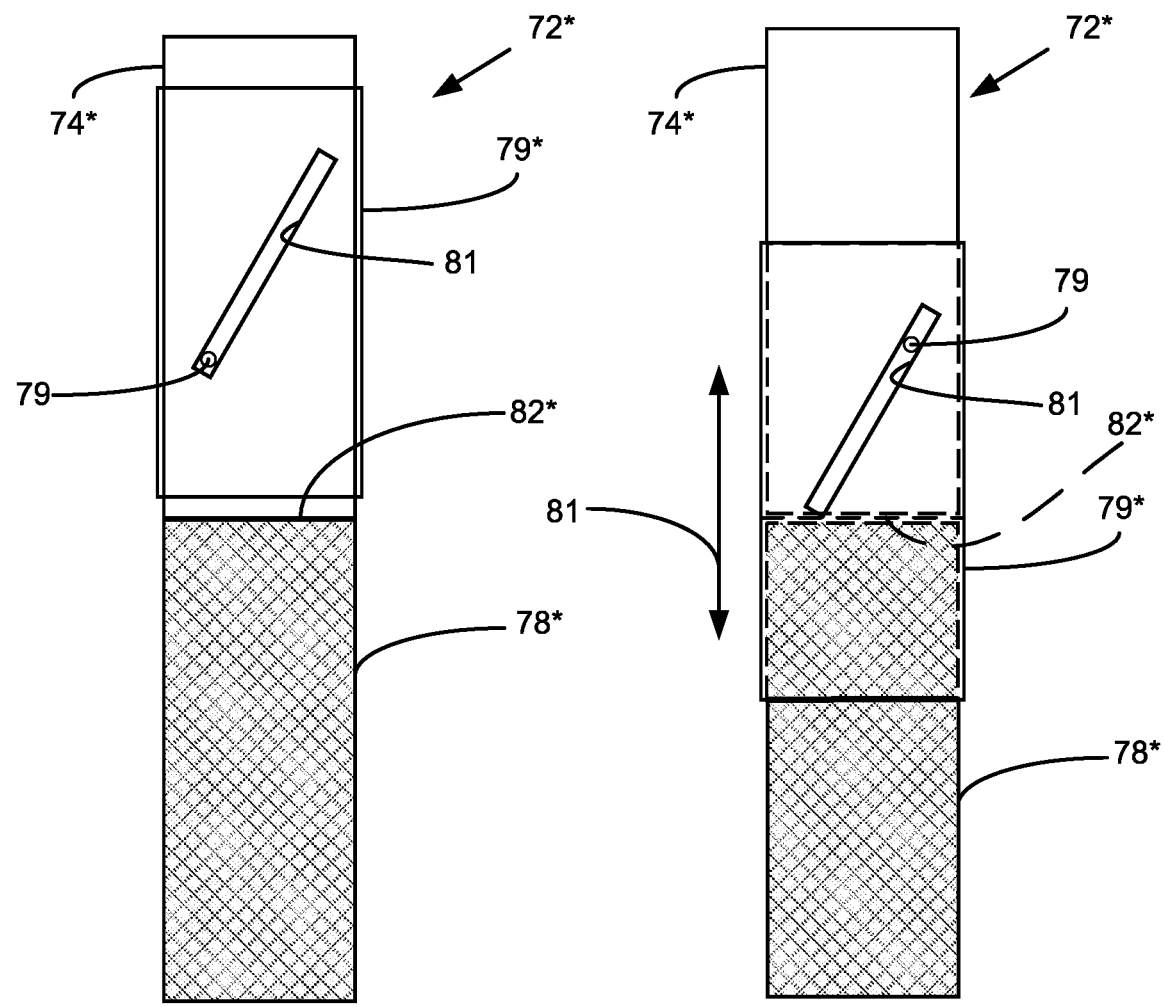
FIG. 15 is a side view of another embodiment of a vacuum-assisted container, this one being an adjustable design, for transferring a load of pellets to the funnel of FIGS. 2-10.
FIG. 16 is a side view of the vacuum-assisted container of FIG. 15, but showing it adjusted to pick up a desired charge (load) of pellets.

FIGS. 15 and 16 show another embodiment of a vacuum-assisted device 72* which may be used for transferring pellets 25 to the funnel 20, 20* of FIGS. 2-10. Like the device 72 disclosed above, the device 72* includes an upper tubular portion 74* and a lower tubular portion 78*. As in the first embodiment, the upper tubular portion 74* is made of a solid-walled material. However, in this embodiment, the lower tubular portion 78* is not made of a solid-walled material but instead is made from a screen mesh material or perforated wall material and is closed off at the top with a screen 82*. As in the first embodiment, the upper and lower tubular portions 74*, 78* are aligned with each other and are connected together. In this case, instead of being secured together by bolted flanges, the upper tubular portion 74* and lower tubular portion 78* are welded together with the screen 82* welded in place at the welded joint. In this embodiment, an additional solid-walled cylindrical sleeve 79* is sized to slide over the upper and lower tubular portions 74*, 78* with a close fit. The lower part of the lower tubular portion 78* which is not covered by the sleeve 79* will not retain pellets. Only the upper part of the lower tubular portion 78* that is covered by the sleeve 79* will retain pellets. There may be a threaded pin 79 projecting from the upper tubular portion 74* which slides in a slotted track 81 on the sleeve 79* to guide the sleeve 79*, and a wing nut (not shown) on the end of the threaded pin 79 may be tightened to lock the sleeve 79* in the desired position by the user. This allows the user to readily adjust the effective length of the lower tubular portion 78* by sliding the sleeve 79* to the desired position and then tightening the wing nut to lock the sleeve 79* in place. In this manner, the user can adjust the volume of porous pellets 25 to be picked up for transport without having to physically cut the bottom tubular portion to the right length as is the case for the first device 72. Other than this difference, the device 72* operates in the same manner as the device 72 described earlier.

It will be obvious to those skilled in the art that modifications may be made to the embodiments described above without departing from the scope of the present invention as claimed.

What is claimed is:

1. A method for loading porous pellets, comprising the steps of:
    providing a tubular member defining a bottom opening, a top opening, and a fluid flow path from said bottom opening to said top opening, with a screen across said fluid flow path which is sized with a small enough mesh to prevent a desired size of porous pellets from passing through said screen while allowing smaller-sized dust to pass through, wherein a lower portion of said tubular member below said screen defines a desired volume;
    providing a vacuum line in fluid communication with said top opening of said tubular member;
    creating an air flow along said fluid flow path and through said vacuum line, with a desired volume of porous pellets in said lower portion of said tubular member;
    moving said tubular member to a position over a desired loading location; and then
    reducing said upward flow of air sufficiently to allow said desired volume of porous pellets to fall down, through said lower portion of said tubular member.

2. A method for loading porous pellets as recited in claim 1, and further including the step of using said air flow to draw said desired volume of porous pellets into said lower portion of said tubular member before allowing said desired volume of porous pellets to fall down.

3. A method for loading porous pellets as recited in claim 1, and further comprising the step of removing a bottom screen cover from said bottom opening before allowing said porous pellets to fall down, through said bottom opening.

4. A method for loading porous pellets as recited in claim 3, and further comprising the step of removing a solid bottom cover from said bottom opening before removing said bottom screen cover.

5. A method for loading porous pellets as recited in claim 4, and further including the step of using said air flow to draw said desired volume of porous pellets into said lower portion of said tubular member; then placing said bottom screen cover over said bottom opening; then placing said bottom solid cover over said bottom screen cover, before removing said bottom solid cover and said bottom screen cover and before allowing said desired volume of porous pellets to fall down through said bottom opening.

* * * * *